United States Patent
Shudark et al.

(10) Patent No.: US 9,541,421 B2
(45) Date of Patent: Jan. 10, 2017

(54) IN-PREMISES MANAGEMENT OF HOME AREA NETWORKS

(71) Applicant: Landis+Gyr Innovations, Inc., Alpharetta, GA (US)

(72) Inventors: Jeff Shudark, Cumming, GA (US); Ruben Emilio Salazar Cardozo, Johns Creek, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 422 days.

(21) Appl. No.: 14/045,143

(22) Filed: Oct. 3, 2013

(65) Prior Publication Data

US 2015/0097693 A1    Apr. 9, 2015

(51) Int. Cl.
*G08B 23/00* (2006.01)
*G01D 4/00* (2006.01)
*H04L 12/28* (2006.01)

(52) U.S. Cl.
CPC ............ *G01D 4/002* (2013.01); *G01D 4/004* (2013.01); *H04L 12/2818* (2013.01); *Y02B 90/242* (2013.01); *Y02B 90/244* (2013.01); *Y04S 20/322* (2013.01); *Y04S 20/327* (2013.01)

(58) Field of Classification Search
CPC .......... G01D 4/00; G01D 4/002; G01D 4/004; G01D 4/008; G01D 4/02
See application file for complete search history.

(56) References Cited

U.S. PATENT DOCUMENTS

| | | | | |
|---|---|---|---|---|
| 7,673,340 | B1 * | 3/2010 | Cohen ................. | G06F 11/3438 379/266.08 |
| 8,635,036 | B2 * | 1/2014 | Pamulaparthy ........ | G01D 4/002 340/870.02 |
| 2008/0177678 | A1 * | 7/2008 | Di Martini ............. | G01D 4/002 705/412 |

(Continued)

FOREIGN PATENT DOCUMENTS

EP           2503298        9/2012
WO      2015050738 A1     4/2015

OTHER PUBLICATIONS

PCT/US2014/056855, "International Search Report and Written Opinion", Nov. 28, 2014, 9 pages.

*Primary Examiner* — Ryan Sherwin
(74) *Attorney, Agent, or Firm* — Kilpatrick Townsend & Stockton LLP

(57) ABSTRACT

Systems and methods are disclosed for providing in-premises management of home area networks. An example management includes a network interface device, a processor in communication with the network interface device, and a transceiver device in communication with the processor. The network interface device can establish a paired communication link with a computing device that is in communication with a head-end system. The processor can receive a command originating from the head-end system and communicated to the management device from the computing device via the paired communication link. The processor can identify a terminal device of the home area network that can perform a function in response to the command. The processor can generate a message for the terminal device including the command. The transceiver device can transmit the message from the processor to the terminal device via a wireless communication link of the home area network.

20 Claims, 4 Drawing Sheets

(56) References Cited

U.S. PATENT DOCUMENTS

| | | | | |
|---|---|---|---|---|
| 2011/0061014 A1* | 3/2011 | Frader-Thompson | . | G01D 4/002 715/771 |
| 2011/0255548 A1 | 10/2011 | Johnson | | |
| 2012/0078548 A1* | 3/2012 | Salazar | .................... | G01D 4/02 702/62 |
| 2012/0150662 A1* | 6/2012 | Hannon | ............. | G06Q 30/0277 705/14.73 |

* cited by examiner

*Prior Art*

US 9,541,421 B2

IN-PREMISES MANAGEMENT OF HOME AREA NETWORKS

TECHNICAL FIELD

This disclosure relates generally to networking and more particularly relates to in-premises management of home area networks.

BACKGROUND

A home area network may be used to communicate data between devices that consume resources in a home or other dwelling (e.g., electricity) and devices that monitor and/or manage the consumption of resources. Utility companies and other resource providers may use home area networks to monitor consumption of the resources by consumers. Using home area networks to monitor consumption of the resources by consumers in a home may allow a utility company or other resource provider to identify distribution issues and other problems.

Home area networks may be provided by transceiver devices included in intelligent metering devices. Connectivity from a metering device to a monitored building may be established by physically attaching the metering device to the monitored building. Physically attaching the metering device to a building or other structure may provide sufficient range and connectivity for deployment environments such as single-dwelling homes. In some deployment environments, such as apartment buildings or other multi-dwelling units, a metering device may be installed at a first location (such as a corner of the building) that is remote from a second location being monitored by the metering device (such as an apartment in a multi-dwelling unit). The distance between the metering device and the home area network may present problems in establishing connectivity from the home area network to the metering device.

It is desirable to provide a simplified communication infrastructure for communicating data between a home area network and a metering device.

SUMMARY

Systems and methods are disclosed for providing in-premises management of home area networks. In some aspects, a management device configured for managing a home area network is provided. The management device can include a network interface device, a processor in communication with the network interface device, and a transceiver device in communication with the processor. The network interface device can establish a paired communication link with a computing device that is in communication with a head-end system via a data network. The processor can receive a command originating from the head-end system. The command can be communicated to the management device from the computing device via the paired communication link. The processor can identify a terminal device of the home area network that can perform a function in response to the command. The processor can generate a message for the terminal device including the command. The transceiver device can transmit the message from the processor to the terminal device via a wireless communication link of the home area network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
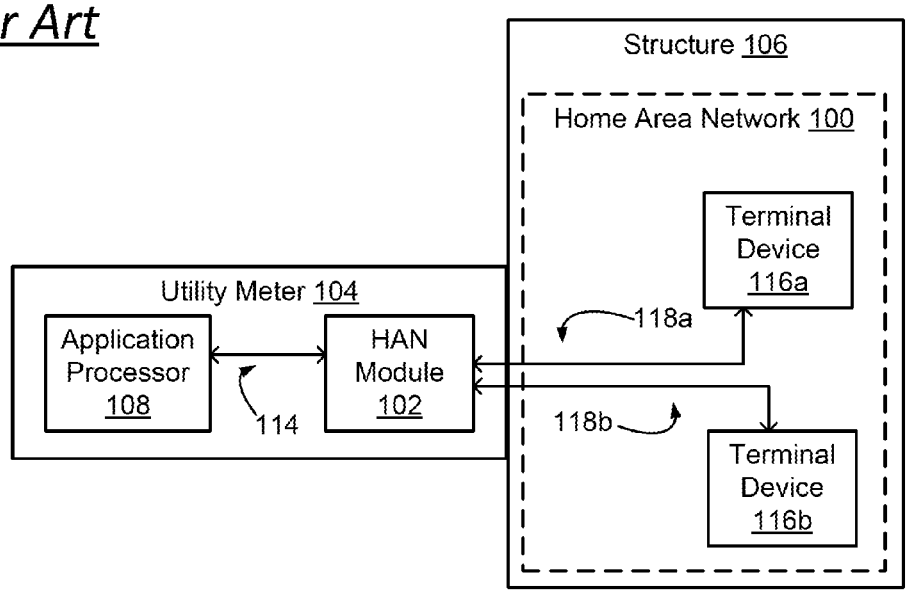
FIG. 1 is a network diagram illustrating an example home area network ("HAN") that can be managed using a HAN module integrated with a utility meter.

Systems and methods are provided for in-premises management of a home area network ("HAN"). In-premises management of a HAN can involve installing a management device in a dwelling or other area serviced by the HAN. The HAN management device can receive commands and communicate responses to a remote computing device (e.g., an intelligent metering device) via a paired communication link or other bidirectional data link. The remote computing device receives commands from and transmits data to a head-end system, such as a collection and management server system of a power distribution system. Using an in-premises HAN management device can reduce crosstalk and other interference caused by transmitting large amounts of HAN-related data between multiple dwellings and HAN modules installed in utility meters. Using an in-premises HAN management device can also provide enhanced security for a HAN in a given dwelling of a multi-dwelling unit as compared to a HAN management device integrated with a utility meter located in a publicly accessible area.

In accordance with some aspects, a management device configured for managing a HAN is provided. The management device can be installed in dwellings, premises, or other structures or geographical areas serviced by the HAN. The management device includes a network interface device, a processor in communication with the network interface device, and a transceiver device in communication with the processor. The network interface device can establish a paired communication link with a computing device that is in communication with a head-end system via a data network. For example, a management device installed in a dwelling of a multi-dwelling unit can communicate via the paired communication link with a metering device or other computing device that is installed at a location in the multi-dwelling unit remote from the management device. The metering device can communicate with a head-end or other server system of a power distribution system that provides power to the multi-dwelling unit. The metering device can communicate with a head-end or other server system via a data network such as the Internet, a proprietary wide area network, etc.

The head-end system can communicate commands to the metering device or other computing device via the data network. The metering device or other computing device can communicate the commands to the management device via the paired communication link. The processor can identify one or more terminal devices of the HAN that can perform one or more functions in response to the command. For example, the functions performed by the terminal devices may include notifying the management device of amounts of power consumed by the terminal devices during a time period specified by the commands. The processor can generate messages including the commands addressed to the terminal devices. The transceiver device of the management device can transmit the message from the terminal devices via one or more wireless communication links of the HAN.

As used herein, the term "home area network" is used to refer to a data network configured to provide communication channels between devices positioned in a dwelling or other residential structure. A HAN can include a smaller number of network devices (e.g., personal computers, mobile computing devices, etc.) as compared to larger data networks, such as local area networks or wide area networks. In some aspects, a HAN can include low-power network devices that can wirelessly communicate with other devices in the HAN. A HAN can be implemented using any suitable networking protocol. Non-limiting examples of suitable networking protocols for implementing a HAN include ZIGBEE®, Bluetooth, Wi-Fi, and the like. Non-limiting examples of a HAN include a HomePlug network implemented via power line communications, a Multimedia over Coax Alliance ("MoCA") network providing network connectivity between appliances and networking devices implemented via coaxial cable, a HomePNA Alliance network, etc.

As used herein, the term "paired communication link" is used to refer to a communication channel including a first network interface device, a suitable communication medium, and a second network interface device that are collectively configured to provide paired delivery of data between the first and second network devices. In some aspects, the paired communication link can include a power line communications link. In other aspects, the paired communication link can be an Ethernet cable link, an optical cable link, or a wireless communication link, such as (but not limited to) a wireless Internet link, a microwave link, etc.

As used herein, the term "data network" is used to refer to a group of devices interconnected by communication channels that allow sharing of information. A communication channel can include any suitable means for communicating data over a network, such as (but not limited to) a copper cable, a fiber optic cable, a wireless transmission, etc.

As used herein, the term "head-end system" is used to refer to a device or group of devices used to provide one or more management functions for a data network or other system including multiple interconnected devices. For example, a head-end system for a power distribution system using intelligent metering may provide communication and/or data collection layers between the smart meter infrastructure of the power distribution system and one or more higher-level data processing systems of the power distribution system.

As used herein, the term "power distribution system" is used to refer to a group of devices, systems, and/or other suitable infrastructure for transferring power from a power source, such as a power plant, to one or more end users or geographical locations, such as a dwelling, structure, or other geographical area.

As used herein, the term "terminal device" is used to refer to any device capable of communicating with other devices via a HAN or other data network. In some aspects, a terminal device can include a processing device configured to execute software performing one or more applications related to managing, monitoring, or otherwise using information regarding one or more attributes of a power distribution system associated with the HAN. Non-limiting examples of such terminal devices include an intelligent metering device for monitoring and analyzing power consumption, a programmable thermostat for managing power consumption, an in-home display device for displaying information related to power consumption and associated billing information for the power consumption, and the like. In additional or alternative aspects, a terminal device can include a network interface device for communicating with the HAN and one or more components that consume power to perform one or more mechanical or other functions in addition to analyzing, monitoring, displaying, or otherwise using data communicated via the HAN. Non-limiting examples of such terminal devices include a water heater having a metering device communicatively coupled to the HAN, a pool pump having a metering device communicatively coupled to the HAN, and the like. In some aspects, such terminal devices can include integrated metering devices and/or other network interface devices for communicating via the HAN. In other aspects, such terminal devices can include auxiliary metering devices and/or other network interface devices that are communicatively coupled to the device.

Using an in-premises HAN management device can provide network management services for the HAN from within the dwelling or other premises serviced by the HAN. For example, a HAN management device for managing a ZIGBEE® network can execute a trust center application for allowing or disallowing new devices to communicate via the HAN. Configuring and/or managing the HAN can include discovering terminal devices, authenticating devices that request to join the HAN, maintaining and distributing network keys for the HAN, joining terminal devices to the HAN, tracking the topology of the HAN, configuring end-to-end security between devices communicating via the HAN, etc. Using an in-premises HAN management device can obviate the need to remotely manage a HAN from a metering device positioned remotely from the dwelling or other geographical area serviced by the HAN.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating an example HAN 100 that can be managed using a HAN module 102 integrated with a utility meter 104.

The HAN 100 can service a structure 106. A non-limiting example of the structure 106 is a unit of a multi-dwelling unit. A multi-dwelling unit can include multiple apartments or other geographical areas used as dwellings. The utility meter 104 can be attached to or otherwise installed in the structure 106. Multiple utility meters 104 can monitor respective structures 106 that are units of a multi-dwelling unit and that include respective HANs 100. In a non-limiting example, a structure 106 such as a multi-dwelling unit can include a control room having multiple utility meters 104 installed in a rack. Each utility meter 104 can monitor a respective dwelling in a multi-dwelling unit.

The utility meter 104 can include the HAN module 102 and an application processor 108. The application processor 108 can access or include a memory device that stores program code executable by the application processor 108. The application processor 108 can communicate data that is received via the HAN 100 to a head-end system via a suitable data network.

The HAN module 102 can communicate with the application processor 108 via a serial link 114. For example, the application processor 108 may obtain data from a memory device of the utility meter 104 and provide the data to the HAN module 102 at regular intervals, such as every 30 seconds. The HAN module 102 can communicate data between the application processor 108 and the structure 106 that is monitored by the utility meter 104.

The HAN module 102 can establish and/or manage the HAN 100 used for communication between the utility meter 104 and terminal devices 116a, 116b. The HAN 100 can include RF links 118a, 118b or other suitable wireless communication links between the HAN module 102 and the terminal devices 116a, 116b. The HAN module 102 can provide data received from the terminal devices 116a, 116b via the RF links 118a, 118b to the application processor 108 via the serial link 114. The HAN module 102 can also transmit commands received from the application processor 108 via the serial link 114 to the terminal devices 116a, 116b via the RF links 118a, 118b.

In some deployment environments, such as an apartment building or other multi-dwelling unit, a utility meter 104 or other device servicing a given dwelling may be installed at a location that is remote from the dwelling being serviced. For example, the utility meter 104 may be installed in a utility closet at one end of the structure 106 and may service a dwelling at an opposite end of the structure 106.

Figure 2:
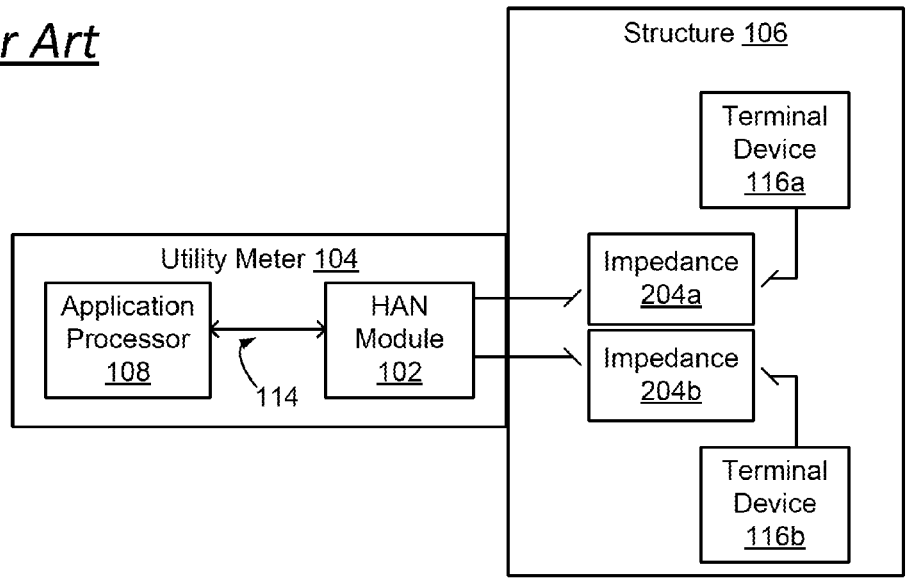
FIG. 2 is a network diagram illustrating the example HAN having impedance sources blocking RF connectivity between the HAN module integrated with a utility meter and terminal devices of the HAN.

The distance between the metering device and the home area network may present problems in establishing connectivity from the HAN 100 and the HAN module 102. For example, FIG. 2 is a network diagram illustrating the example HAN 100 having impedance sources 204a, 204b blocking RF connectivity between the HAN module 102 integrated with a utility meter 104 and the terminal devices 116a, 116b. The structure 106 can be, for example, a unit of a multi-dwelling unit. Although FIG. 2 depicts the impedance sources 204a, 204b within the structure 106 for illustrative purposes, one or more of impedance sources 204a, 204b can be present external to the structure 206. For example, the impedance sources 204a, 204b depicted in FIG. 2 can include other dwellings, walls, and/or other structures in or near the structure 206 that can block, disrupt, or otherwise interfere with the RF links 118a, 118b.

Figure 3:
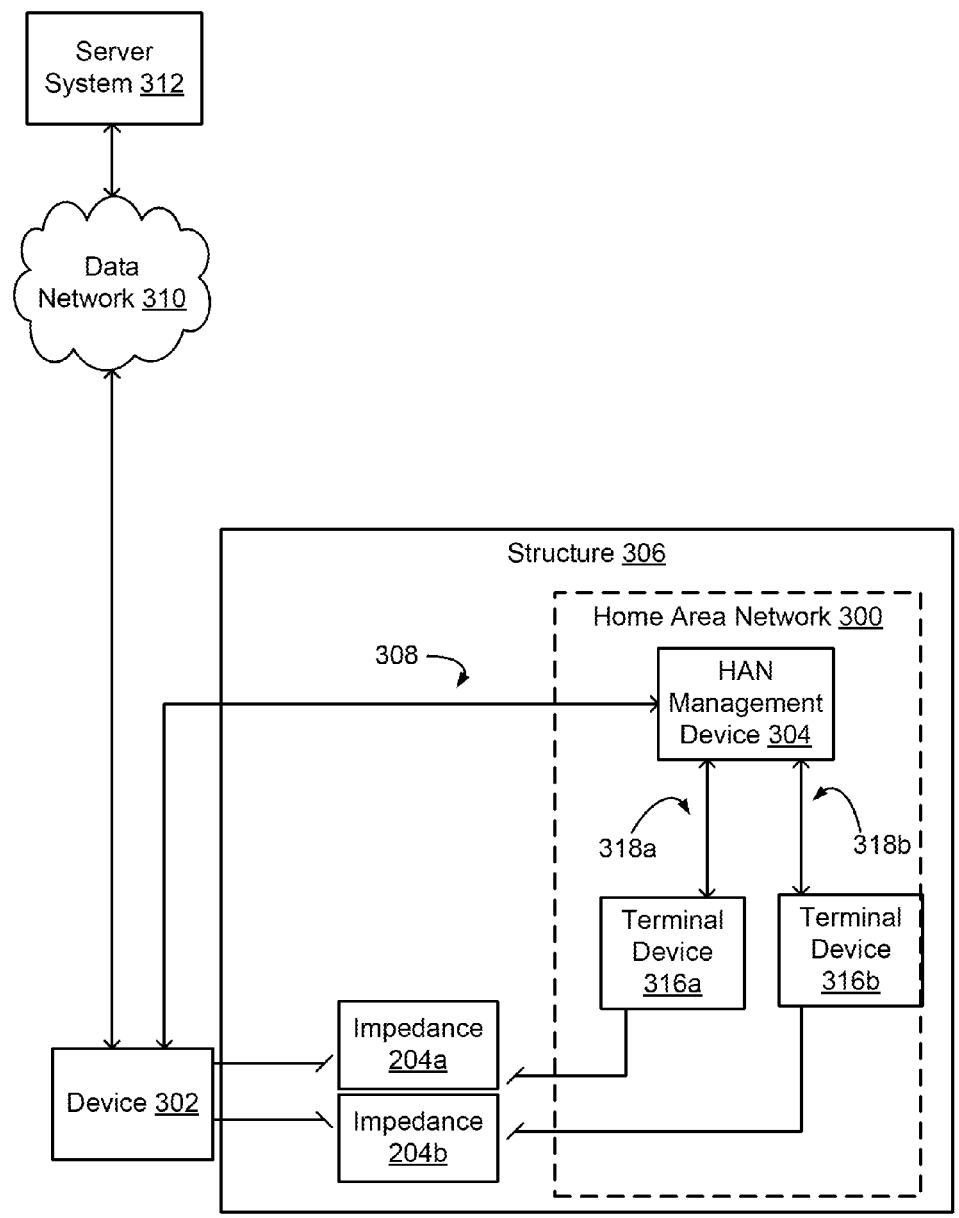
FIG. 3 is a network diagram illustrating an example HAN having a HAN management device that is disposed in a serviced dwelling and is accessible via a paired communication link.

The disruptions caused by the impedance sources 204a, 204b can be reduced or eliminated by implementing in-premises HAN management. For example, FIG. 3 is a network diagram illustrating an example HAN 300 managed by a HAN management device 304 that is disposed in a serviced dwelling of a structure 306 and that is in communication with a remote device 302 via a paired communication link 308.

Any suitable process can be used to install the HAN management device 304 in a dwelling or other geographical area serviced by the HAN 300. For example, the HAN management device 304 can be hardwired into a panel or other power control device in a dwelling serviced by the HAN 300 such that the HAN management device 304 is hidden from consumers in the serviced dwelling.

The paired communication link 308 can provide bidirectional communication between a remote device 302 and the HAN management device 304 that is unimpeded by impedance sources 204a, 204b. A non-limiting example of a device 302 is an intelligent metering device for a power distribution network or other resource provider. The paired communication link 308 can be used to communicate commands and other data between the remote device 302 and the HAN management device 304 similar to the commands and other data communicated between the application processor 108 and the HAN module 102 via the serial link 114. For example, function calls and other inter-processor commands communicated between the application processor 108 and the HAN module 102 via the serial link 114 in FIGS. 1 and 2 can be communicated via the paired communication link 308. Limiting communication via the paired communication link 308 to such function calls and other inter-processor commands can minimize or otherwise reduce data traffic between one or more structures 306 and one or more respective devices 302 to which devices in the one or more structures 306 are communicatively coupled.

The HAN management device 304 can manage a HAN 300 in a dwelling or other geographical area of the structure 306. The HAN 300 can be established using any wireless communication protocol suitable for wireless communication among the HAN management device 304 and the terminal devices 316a, 316b in the geographical area serviced by the HAN 300. Non-limiting examples of a suitable protocol for establishing a HAN 300 include ZIGBEE®, Wireless Meter-Bus ("M-Bus"), Z-Wave, etc. In additional or alternative aspects, a HAN 300 can include one or more wireline communications implemented using protocols such as (but not limited to) HOMEPLUG GREEN PHY™, G3-PLC, PRIME, P1901.2, etc.

The HAN management device 304 can communicate with the terminal devices 316a, 316b via RF links 318a, 318b. A non-limiting example of a HAN 300 is a network having RF links 318a, 318b with a wireless communication range of less than 100 meters. In some aspects, latency in communications between the HAN management device 304 and the terminal devices 316a, 316b can be reduced by communicating data traffic over the in-premises RF links 318a, 318b as compared to communicating data from terminal devices 116a, 116b over RF links 118a, 118b to a remotely located HAN module 102.

The device 302 can include any suitable computing device configured to communicate data between the HAN 300 and a data network 310 separate from the HAN 300. A non-limiting example of a device 302 is an intelligent metering device for a power distribution network or other resource provider. A processor in the device 302 can use readings from one or more metering components in the device 302 to monitor the consumption of power or other resources in a dwelling or other geographical area serviced by the HAN 300.

The device 302 can communicate with a server system 312 or other head-end system via a data network 310. A non-limiting example of a server system 312 is a head-end system for a power distribution network that provides power to a structure 106 or other geographical area serviced by the HAN 100. The data network 310 can provide communication channels between one or more utility meters 104 and the server system 312. A communication channel can include any suitable means capable of communicating signals between the utility meter 104 and the server system 312. Examples of suitable communication media include (but are not limited to) Ethernet cable, wireless data communication, power cables for use in power line communication ("PLC"), etc. Power line communication can include communicating signals via cables used for providing electric power from a utility company to buildings in a geographic area. The data network 310 can be configured using any suitable network topology, such as (but not limited to) a mesh network, a ring network, a star network, a bus network, etc.

The HAN management device 304 can communicate with the device 302 via the paired communication link 308. The paired communication link 308 can provide paired delivery of commands and other data between a first device, such as a computing device 302, and a second device, such as the HAN management device 304. The paired communication link 308 between the computing device 302 and the HAN management device 304 can include any secure communication medium configured to communicate serialized data between the metering device 302 and the HAN management device 304.

In some aspects, the paired communication link 308 can be a power cable configured for performing power line communications. For example, the device 302 may be a utility meter or other metering device. The metering device 302 can be connected to a dwelling or other geographical area serviced by the HAN 300 via an electrical cable, such as a cable having two wires. The paired communication link 308 can include the electrical cable and network interface devices in the device 302 and the HAN management device 304 configured for power line communication of data between the device 302 and the HAN management device 304.

In other aspects, the paired communication link 308 between the device 302 and the HAN management device 304 can include network interface devices and a communication medium collectively configured for communicating packetized data. For example, the paired communication link 308 may include an Ethernet cable link or a fiber optic cable that communicatively couple network interface devices in the device 302 and the HAN management device 304. In other aspects, the paired communication link 308 between the metering device 302 and the HAN management device 304 can be a wireless communication link, such as (but not limited to) a wireless Internet link, a microwave link, etc.

Any suitable communication protocol can be used for communicating data via the paired communication link 308 via the HAN management device 304 and the metering device 302. For example, a suitable communication protocol may be a protocol used for communicating data at rates of several kilobits per second. Non-limiting examples of communication protocols for establishing the paired communication link 308 include wired protocols such as Serial RS232, Ethernet, HOMEPLUG GREEN PHY™, G3-PLC, PRIME, P1901.2, etc., and/or wireless protocols such as Wi-Fi, WiMAX, proprietary wireless protocols, etc.

The HAN 300 can also include terminal devices 316a, 316b. In some aspects, the terminal devices 316a, 316b can include devices used to perform functions and/or execute software applications related to a common system, purpose, application, function, etc., with respect to a structure, dwelling, or other geographical area serviced by the HAN 300. For example, the HAN 300 can include devices that consume power or other resources provided to a dwelling serviced by the HAN 300 by a power distribution network or other resource provider. The HAN 300 can also include devices executing applications for monitoring and/or managing the power or other resource to the dwelling.

One or more of the terminal devices 316a, 316b may be devices that consume power to perform one or more mechanical functions or other functions in addition to analyzing, monitoring, displaying, or otherwise using data communicated via the HAN 300. Non-limiting examples of such devices include devices that consume power to perform one or more mechanical functions in a dwelling or other structure serviced by the HAN 300, such as (but not limited to) a water heater, a pool pump, an air conditioner, etc.

Devices that consume power can include or be communicatively coupled to sensing devices or other metering devices for monitoring power consumption and/or network devices for accessing the HAN 300. Devices such as pool pumps, water heaters, smart appliances, irrigation pumps, lighting devices, generation systems, etc. can communicate data regarding one or more attributes related to resource consumption by a dwelling, structure, and/or other geographical area serviced by a HAN 300. Non-limiting examples of data regarding one or more attributes related to resource consumption include: instantaneous demand on a grid or other power distribution system; a duty cycle; an average usage over a suitable interval such as (but not limited to) a day, a week, a month, etc.; a minimum and/or maximum demand over a suitable interval such as (but not limited to) a day, a week, a month, etc.; one or more mode settings such as (but not limited to) a conservation mode for reducing the rate of resource consumption, an on/off timer mode, a heating/cooling mode, actions performed responsive to pricing for the consumed resource, a time-of-use level, and/or some combination thereof.

One or more of the terminal devices 316a, 316b may additionally or alternatively be devices dedicated to analyzing, monitoring, displaying, or otherwise using data communicated via the HAN 300. Non-limiting examples of such terminal devices 316a, 316b include devices that display information related to power consumption (such as a display device displaying a projected cost based on the current power consumption) and/or devices configured for managing power consumption (e.g., a programmable thermostat).

In some aspects, the HAN 300 can be used to monitor power consumption by one or smart appliances included in the HAN 300. A smart appliance can include any appliance having been configured to provide information regarding the amount of a power or other resources consumed by operation of the appliance. A non-limiting example of a smart appliance is a smart refrigerator configured to monitor the amount of electricity used to power the smart refrigerator. A smart appliance can include a memory device and a processor. An identifier for the smart appliance can be stored in the memory device. The smart appliance can be joined to the HAN 300 by providing the identifier to the HAN management device 304.

Figure 4:
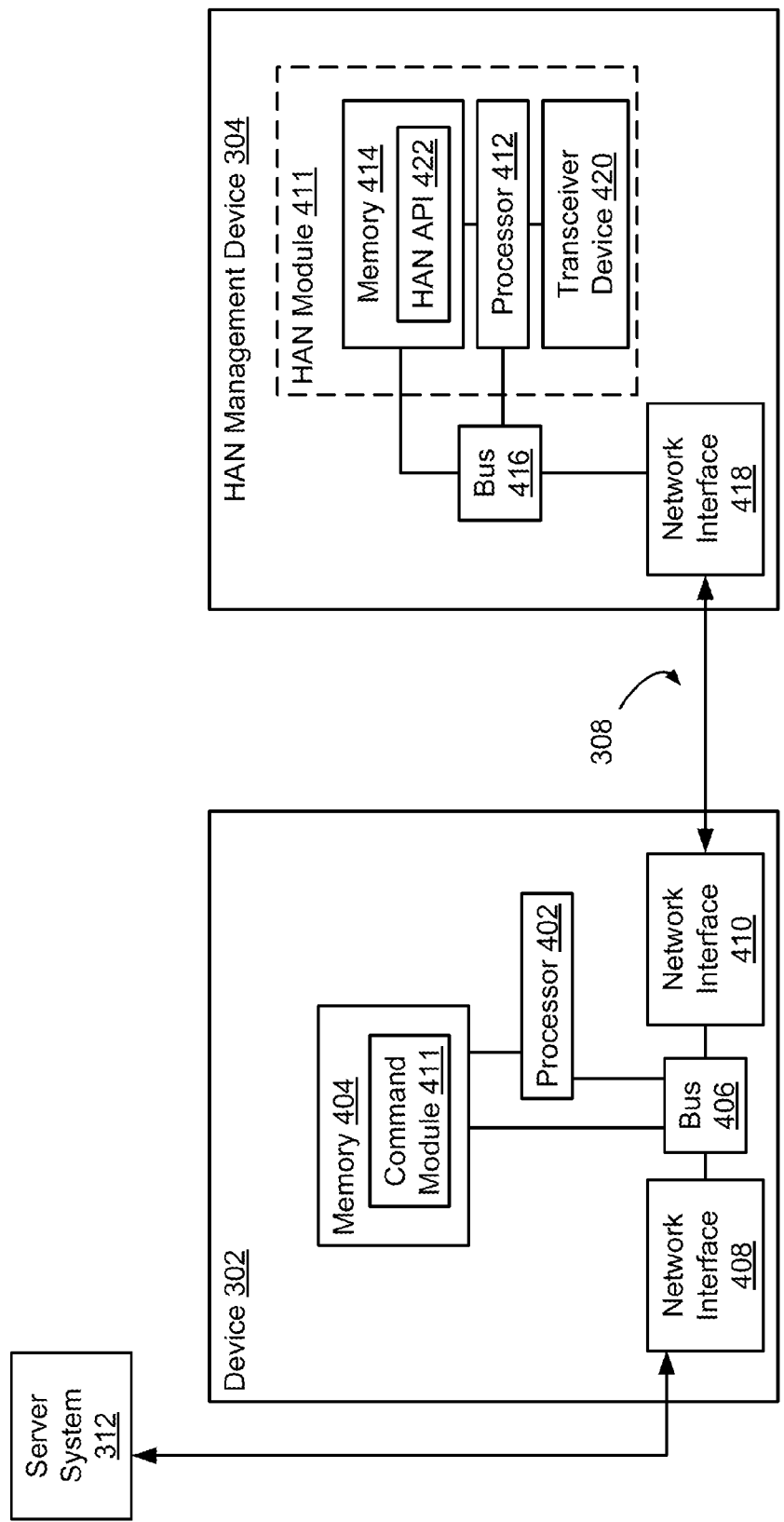
FIG. 4 is a block diagram depicting example computing systems for implementing the example HAN having the HAN management device disposed in a serviced dwelling.

FIG. 4 is a block diagram depicting example computing systems for implementing the example HAN 300 having the HAN management device 304 disposed in a serviced dwelling. The example computing systems include the device 302 and the HAN management device 304.

The device 302 and the HAN management device 304 can respectively include processors 402, 412. Non-limiting examples of the processors 402, 412 include a microprocessor, an application-specific integrated circuit ("ASIC"), a state machine, or other suitable processing device. Each of the processors 402, 412 can include any number of processing devices, including one. The processors 402, 412 can be communicatively coupled to computer-readable media, such as memory devices 404, 414. The processors 402, 412 can execute computer-executable program instructions and/or accesses information respectively stored in the memory devices 404, 414.

Each of the memory devices 404, 414 can store instructions that, when executed by the processors 402, 412, cause a respective one of the processors 402, 412 to perform operations described herein. Each of the memory devices 404, 414 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The device 302 and the HAN management device 304 respectively include buses 406, 416. Each of the buses 406, 416 can communicatively couple one or more components of a respective one of the device 302 and the HAN management device 304.

Although the processors 402, 412, the memory devices 404, 414, and the busses 406, 416 are respectively depicted in FIG. 4 as separate components in communication with one another, other implementations are possible. For example, the processors 402, 412, the memory devices 404, 414, and the busses 406, 416 can be respective components of respective printed circuit boards or other suitable devices that can be disposed in a device 302 and/or a HAN management device 304 to store and execute programming code.

The device 302 can also include network interface devices 408, 410. The HAN management device can include a network device 418. The network interface device 408 can be a network device configured to establish a connection via the data network 310. Non-limiting examples of the network interface device 408 include an Ethernet card, a cable modem, etc.

The server system 312 can include any suitable computing system for aggregating or otherwise using data received from devices 302 such as utility meters. In some aspects, the server system 312 may be a single computing system. In other aspects, the server system 312 may be a virtual server implemented using a number of computing systems connected in a grid or cloud computing topology.

The network interface device 410 can be a network device configured to establish a paired communication link with the HAN management device 304 via the network interface device 418. Non-limiting examples of the network interface devices 410, 418 include power line transceivers, Ethernet transceivers such as medium attachment units, microwave transceivers, etc.

FIG. 4 also depicts a command module 411 stored in the memory device 404 of the device 302. The command module 411 can configure the processor 402 to collect, aggregate, or otherwise use metrics and/or other data related to the HAN 300.

The HAN management device 304 can also include a transceiver device 420. Non-limiting examples of a transceiver device 420 include RF transceivers and other transceivers for wirelessly transmitting and receiving signals. The terminal devices 316*a*, 316*b* can include transceiver devices for communication with the HAN management device 304 via the transceiver device 420.

FIG. 4 also depicts a HAN application programming interface ("API") 422 stored in the memory device 414 of the HAN management device 304. The processor 412 can execute the HAN API 421 to perform one or more operations for communicating data and/or function calls between the HAN management device 304 and the terminal devices 316*a*, 316*b*. For example, the HAN API 421 can include function calls for monitoring and/or managing power consumption by appliances or other devices in a dwelling or other geographical area serviced by the HAN 300. A function call can include an expression in a programming language identifying an action to be performed. A function call can include a name of the function and a list of inputs or other parameters on which the function will act. The paired communication link 308 can provide bidirectional communication between the remote device 302 and the HAN management device 304 for communicating commands and other data between command module 411 of the remote device 302 and the HAN module 411 of the HAN management device 304.

The HAN API 421 can provide an interface configured for supporting multiple HAN technologies. For example, the HAN API 421 can support the data structures that are appropriate for home energy management applications such as provisioning, demand response load control, text messaging, price, usage (historical and instantaneous), etc.

Figure 5:
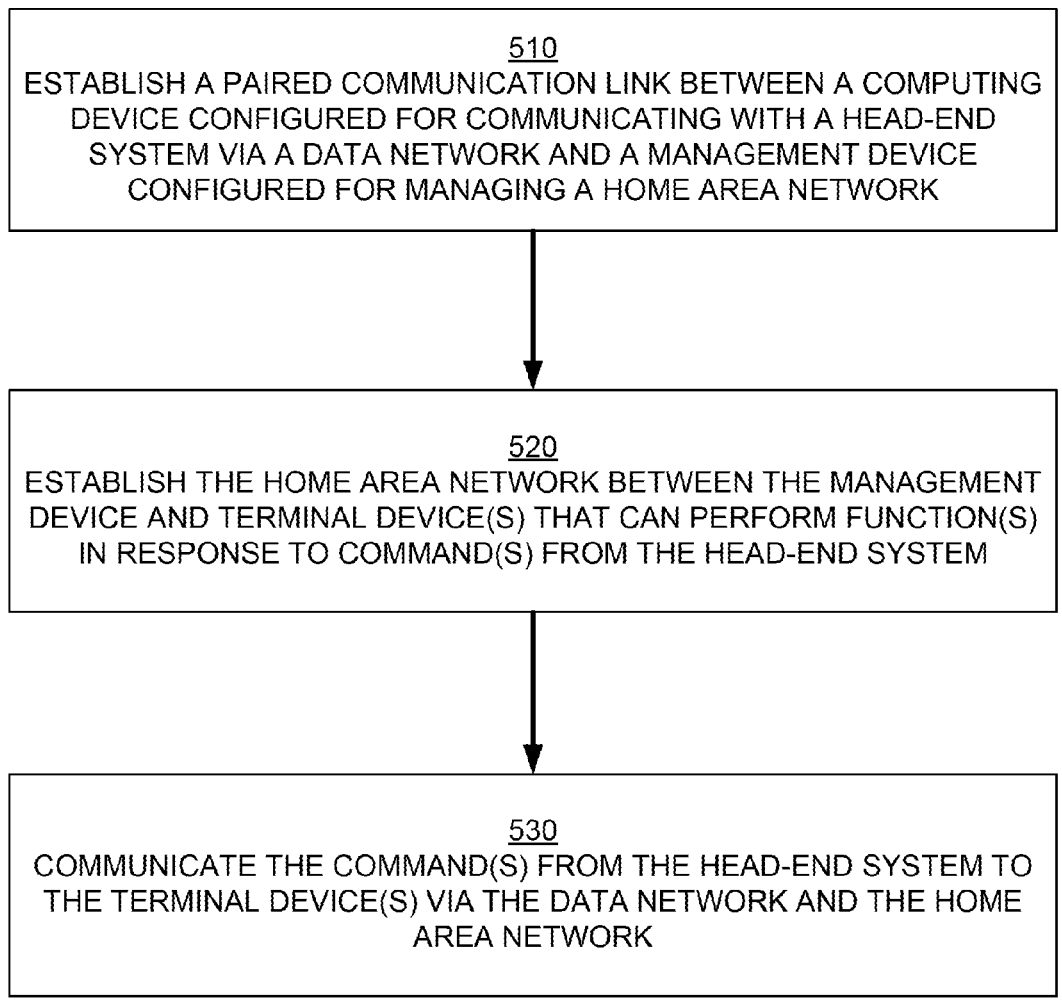
FIG. 5 is a flow chart illustrating an example method for providing in-premises management of a HAN.

FIG. 5 is a flow chart illustrating an example method 500 for providing in-premises management of a HAN 300. For illustrative purposes, the method 500 is described with reference to the system implementations depicted in FIGS. 3-4. Other implementations, however, are possible.

The method 500 involves establishing a paired communication link 308 between a computing device 302 configured for communicating with a head-end system via a data network and a HAN management device 304 configured for managing a HAN 300, as shown in block 510. The paired communication link 308 can be established over a suitable communication medium between the network interface device 410 of the device 302 and the network interface device 418 of the HAN management device 304, as depicted in FIG. 4. The communication medium for the paired communication link 308 can be a power line communication link, an Ethernet link, a microwave link, an optical link, etc.

The method 500 further involves establishing the HAN 300 between the HAN management device 304 and one or more terminal devices 316*a*, 316*b*, as shown in block 520.

The terminal devices 316a, 316b can perform one or more functions in response to commands from server system 312 or other suitable head-end system.

The method 500 further involves communicating commands from the server system 312 or other suitable head-end system to the terminal devices 316a, 316b via the data network 310 and the HAN 300, as shown in block 530.

In a non-limiting example, a server system 312 for a power distribution system can periodically instruct one or more metering devices 302 to obtain updated power consumption information regarding one or more respective dwellings in the structure 306. The server system 312 can transmit one or more commands to the metering device(s) 302 to obtain updated information. The command module 411 of the device 302 can receive the commands. In some aspects, the command module 411 can transmit the commands to the HAN management device 304. In other aspects, the command module 411 can transmit one or more function calls to the HAN management device 304 that correspond to the commands received from the server system 312. The one or more function calls can identify specific functions of the HAN API 422, such as a function to retrieve information from the terminal devices 316a, 316b. The one or more function calls can also include specific parameters for the functions of the HAN API 422, such as a period of time for which the HAN management device 304 is to obtain power consumption data from the terminal devices 316a, 316b.

The HAN management device 304 can generate a respective message for each of the terminal devices 316a, 316b identifying the function to be performed (i.e., transmitting power consumption data) and one or more parameters associated with the function (i.e., the time period for the power consumption). The HAN management device 304 can transmit the messages to the terminal devices 316a, 316b via the RF links 318a, 318b. The HAN management device 304 can receive the power consumption data from the terminal devices 316a, 316b via the RF links 318a, 318b. The HAN management device 304 can provide updated power consumption data to the device 302 via the paired communication link 308. The device 302 can provide the updated power consumption data to the server system 312 via the data network 310.

Non-limiting examples of commands or other data communicated from the server system 312 to the HAN management device 304 using the paired communication link 308 may include temperature setting; message display; connection or disconnection of heating, ventilation, and air conditioning; connection or disconnection of a pump; connection or disconnection of a water heater; time of day and time updates, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulates or transforms data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A management device configured for managing a home area network, the management device comprising:
 a network interface device configured for establishing a paired communication link with a computing device communicatively coupled to a head-end system via a data network;
 a processor communicatively coupled to the network interface device, the processor configured for:
  executing an application programming interface comprising functions for managing the home area network;
  receiving, via the paired communication link and from the computing device, a function call for the application programming interface that corresponds to instructions originating from the head-end system, wherein the paired communication link is limited to communicating inter-processor commands comprising function calls of the application programming interface,
  generating, via execution of the application programming interface, a command based on the function call,
  identifying a terminal device of the home area network that is configured to perform a function in response to the command, and
  generating a message for the terminal device including the command; and
 a transceiver device communicatively coupled to the processor and configured for transmitting the message from the processor to the terminal device via a wireless communication link of the home area network.

2. The management device of claim 1,
 wherein the home area network is configured for communicating information regarding a resource consumed at a geographical area serviced by the home area network,
 wherein the computing device comprises a metering device configured to monitor consumption of the resource at the geographical area,
 wherein the function is associated with monitoring a portion of the resource consumed by the terminal device.

3. The management device of claim 2,
 wherein the resource provided to the geographical area comprises power,
 wherein the function comprises notifying the management device of the portion of the power consumed by the terminal device in a period of time specified by the command,
 wherein the processor is further configured to generate an additional message to the metering device comprising power consumption information at least partially determined from the portion of the power consumed by the terminal device.

4. The management device of claim 1, wherein the processor is further configured for establishing the home area network between the management device and the terminal device by:
 receiving a device identifier from the terminal device; and
 authenticating the terminal device for communication via the home area network based on the identifier.

5. The management device of claim 1, wherein the paired communication link comprises a power cable configured for providing power line communication between the computing device and the management device.

6. The management device of claim 1, wherein the paired communication link comprises at least one of an Ethernet cable and a fiber optic cable for communicating data between the computing device and the management device.

7. The management device of claim 1, wherein the paired communication link comprises a microwave link for communicating data between the computing device and the management device.

8. A system configured for monitoring consumption of a resource at a geographical area, the system comprising:
 a metering device communicatively coupled to a head-end system via a data network, wherein the metering device is configured for receiving a command from the head-end system;
 a management device communicatively coupled to the metering device via a paired communication link and configured for managing a home area network, wherein the paired communication link is limited to communicating inter-processor commands comprising function calls of the application programming interface, the management device comprising:
  a network interface device configured for receiving, via the paired communication link, an inter-processor command corresponding to the command from the head-end system;
  a processor communicatively coupled to the network interface device, the processor configured for:
   identifying a terminal device of the home area network that is configured to perform a function in response to the command, and
   generating, from the inter-processor command, a message for the terminal device including the command; and
  a transceiver device communicatively coupled to the processor and configured for transmitting the message from the processor to the terminal device via a wireless communication link of the home area network, wherein the command included in the message comprises a function call for an application programming interface of the management device.

9. The system of claim 8,
 wherein the resource provided to the geographical area comprises power,
 wherein the function comprises notifying the management device of a portion of the power consumed by the terminal device in a period of time specified by the command,
 wherein the processor is further configured to generate an additional message to the metering device comprising power consumption information at least partially determined from the portion of the power consumed by the terminal device.

10. The system of claim 8, wherein the processor is further configured for establishing the home area network between the management device and the terminal device by:
 receiving a device identifier from the terminal device; and
 authenticating the terminal device for communication via the home area network based on the identifier.

11. The system of claim 8, wherein the paired communication link comprises a power cable configured for providing power line communication between the metering device and the management device.

12. The system of claim 8, wherein the paired communication link comprises at least one of an Ethernet cable and a fiber optic cable for communicating data between the metering device and the management device.

13. The system of claim 8, wherein the paired communication link comprises a microwave link for communicating data between the metering device and the management device.

14. A method comprising:
 establishing a paired communication link between a computing device configured for communicating with a head-end system via a data network and a management device configured for managing a home area network, wherein the paired communication link is limited to communicating inter-processor commands comprising function calls of the application programming interface;
 establishing the home area network between the management device and a terminal device, wherein a command corresponding to instructions from the head-end system causes the terminal device to perform a function; and
 communicating to the terminal device via the data network and the home area network, wherein communicating the command comprises:
  receiving, by the management device and from the computing device, an inter-processor command comprising a function call for an application programming interface comprising functions for managing the home area network,
  generating, by the management device, the command based on the function call, and
  transmitting, by the management device, the command to the terminal device.

15. The method of claim 14, wherein the home area network is configured for communicating information regarding a resource consumed at a geographical area serviced by the home area network and the function is associated with monitoring a portion of the resource consumed by the terminal device.

16. The method of claim 15, wherein the resource provided to the geographical area comprises power and wherein the function comprises notifying the management device of the portion of the resource consumed by the terminal device in a period of time specified by the command.

17. The method of claim 14, wherein establishing the home area network between the management device and the terminal device comprises:
 receiving, by the management device, a device identifier from the terminal device; and
 authenticating, by the management device, the terminal device for communication via the home area network based on the identifier.

18. The method of claim 14, wherein the paired communication link comprises a power cable configured for providing power line communication between the computing device and the management device.

19. The method of claim 14, wherein the paired communication link comprises at least one of an Ethernet cable and a fiber optic cable for communicating data between the computing device and the management device.

20. The method of claim 14, wherein the paired communication link comprises a microwave link for communicating data between the computing device and the management device.

* * * * *